United States Patent [19]
Dalton

[11] Patent Number: 4,780,023
[45] Date of Patent: Oct. 25, 1988

[54] WATERING HOSE

[76] Inventor: David A. Dalton, 25 Progress Way, Croydon, Surrey CR0 4XD, England

[21] Appl. No.: 763,908

[22] Filed: Aug. 8, 1985

[30] Foreign Application Priority Data

Oct. 16, 1984 [GB] United Kingdom ............... 8426107

[51] Int. Cl.$^4$ .................. E02B 13/00; A01G 25/00
[52] U.S. Cl. ........................... 405/43; 47/48.5; 239/276
[58] Field of Search .............. 405/36, 43, 44, 45, 405/48; 47/48.5; 239/542, 276

[56] References Cited

U.S. PATENT DOCUMENTS

| | | | |
|---|---|---|---|
| 2,750,232 | 6/1956 | Szantay et al. | 405/43 X |
| 2,771,320 | 11/1956 | Korwin | 405/43 X |
| 2,954,194 | 9/1960 | Alfano | 248/87 X |
| 3,134,233 | 5/1964 | Morrison | 405/36 |
| 3,176,773 | 4/1965 | Headrick et al. | 239/276 X |
| 3,387,786 | 6/1968 | Rynberk | 239/276 X |
| 3,701,477 | 10/1972 | Matt et al. | 239/276 |

FOREIGN PATENT DOCUMENTS 118785  2/1970  Norway .................. 405/43

Primary Examiner—David H. Corbin
Attorney, Agent, or Firm—Kinzer, Plyer, Dorn, McEachran & Jambor

[57] ABSTRACT

The invention concerns a watering hose for use in gardens, parks, green-houses and other such places to water flowers and other plants, the hose having a flat, stiff blade or strip of extruded synthetic plastics material which is bonded to tubing provided with spray apertures so as to serve as a means of fixing the hose to the ground or to one or more supports such as a wooden fence. When fixed to the ground, the blade is thin enough to permit it to be forced into the ground along the edge of a lawn facing a flower bed or any other convenient position in a park, garden or other place where the watering hose is required.

1 Claim, 1 Drawing Sheet

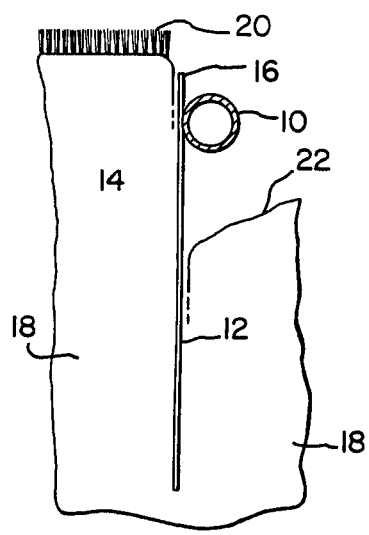
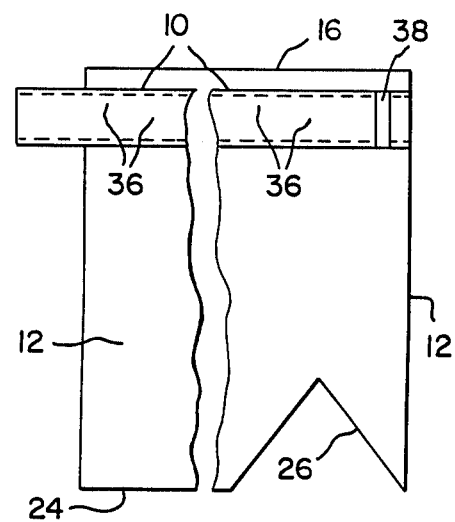
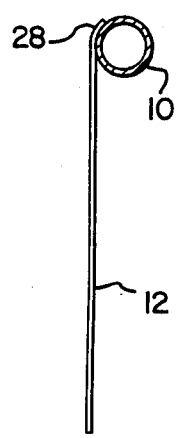
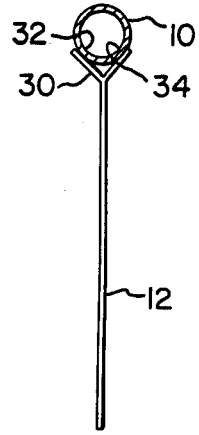
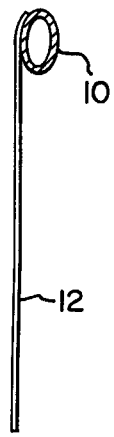
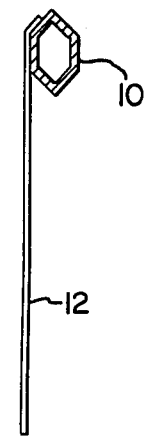
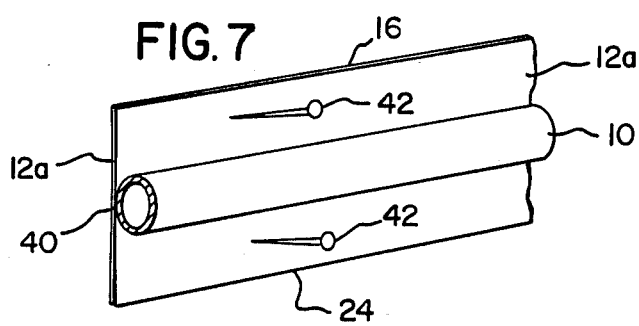

WATERING HOSE

This invention relates to watering hoses adapted to be fixed permanently or semi-permanently in gardens, parks, green-houses, hot-houses an other places where plants, verges, lawns, trees and other items need to be sprayed with water at intervals of time.

It has already been proposed to arrange hoses or pipes as fixtures along, say, a flower bed in a park or garden so that water can be sprayed on to the flowers or other plants in the bed by simply turning on a tap connected to one end of the hose or pipe. Hitherto the hose or pipe has been fixed to the ground by pegs or stakes provided at intervals along the length of the pipe or hose.

The aim of the present invention is to provide a watering hose with fixing means which are permanently secured to it along its length, and according to the invention a watering hose has spaced-apart spray apertures along its length and is provided, also along its length, with fixing means which form a permanent part of the hose for fixing the hose to the ground or to one or more supports.

Preferably the hose has fixing means in the form of a stiff thin blade of synthetic plastics material which extends along the hose for all that length of the latter which is provided with spray apertures. This permits a watering hose in accordance with the invention to be made by the so-called dual-hardness extrusion method whereby the hose is extruded from hot plasticised PVC or other synthetic plastics material with the fixing blade or strip being hot extruded simultaneously from unplasticised PVC or other synthetic plastics material. While the extruded hose and extruded blade or strip are still molten, they are brought together so that they become permanently attached to each other.

It has also been found advantageous if the spray apertures along the length of the hose take the form of slits rather than round holes. This not only prevents dirt from clogging the spray apertures but it also ensures that water is ejected from the hose through the apertures in the form of sprays rather than jets. As will be appreciated, a spray is much to be preferred for watering plants and flowers to a jet.

By way of example, a number of watering hoses in accordance with the invention are shown in the accompanying drawings, in which FIG. 1 is a section through one form of hose shown fixed in the ground;

FIG. 2 is a front view of part of the hose shown in FIG. 1; and

FIGS. 3–7 are sections similar to FIG. 1 through five other forms of hose in accordance with the invention.

The hose shown in FIGS. 1 and 2 comprises a length of tubing 10 which is hot extruded from plasticised PVC or other synthetic plastics material. Normally, the tubing will be of standard ½" diameter of the kind frequently used in gardens and parks to water flowers and other plants.

During the extrusion of the hose 10, a flat stiff blade or strip 12 is extruded using unplasticised PVC or other synthetic plastics material. While both the blade 12 and the tubing 10 are still in a tacky condition after being forced through their respective moulding dyes, they are brought together so that a longitudinal portion 14 of the blade 12 a little below the top edge 16 of the latter is permanently bonded to the outer surface of the tubing 10 as shown in FIG. 1. The blade 12 thus serves as a means for fixing the hose to the ground, the blade being thin enough to permit it to be forced into the ground 18 along the edge of a lawn 20 facing a flower bed 22 or other part of a park, garden or other place where the watering hose is required. The lower edge 24 of the blade can be straight as shown on the left-hand side of FIG. 2 or it can be made of toothed formation as shown at 26 on the right-hand side of FIG. 2. The extent to which the blade 12 is pushed into the ground will be dependent on individual preferences but it will be normal for the upper edge 16 of the blade 12—and therefore the tubing 10—to be no higher than the edge of the lawn 20 so that mowers and other gardening tools used to cut the grass of the lawn will not cut into the tubing 10 and the blade 12. Because the blade 12 extends a short distance above the top of the tubing 10, the upper edge 16 of the blade can also serve as a guide surface for correctly positioning the hose with respect to the edge of the lawn 20.

A modification of the hose is shown in FIG. 3 where the upper marginal portion 28 of the blade 12 is turned over and bonded to the outer surface of the tube. Another modification is shown in FIG. 4 where the upper end of the blade is made of V formation as shown at 30 so that the tubing 10 is attached to the blade 12 at two points 32 and 34.

It is not necessary for the tubing 10 to be of circular section. Merely by way of example, FIGS. 5 and 6 show alternative cross-sections for the tubing, the cross-section in FIG. 5 being of flattened tubular shape and that in FIG. 6 being of hexagonal shape.

Along the length of the tubing from which water is to be sprayed, a number of spray apertures are preferably arranged in two or more speced-apart lines along the length of the tubing so that the sprayed water falls on areas near to the hose and also further away from the hose. It has been found that these apertures should be in the form of slits rather than holes as slits produce good sprays while holes tend to produce jets. In addition, there is less risk of slits becoming clogged with dirt. Normally the gap between adjacent slits along the pipe can be about 23 cm.

In the case of FIG. 4, rows of apertures 28 can be provided on either side of a vertical plane passing through the longitudinal axis of the hose 10 so that water is sprayed from the hose on both sides of the latter. This form of watering hose is therefore ideal for fixing in the middle sections of flower beds so that it can spray flowers and other plants on both sides of the tube.

One end of the tubing 10 is left open in order to be fitted on to a normal water tap or it can be provided with some form of connecting piece. The other end of the tubing 10 is either end-welded as shown at 38 in FIG. 2 or provided with some form of plug.

FIG. 7 shows another form of hose in which the blade 12a is adapted to be fastened to a wooden fence, wall, posts or other such supports—for example, in a green-house or hot-house. For this purpose, the tubing 10 is bonded to a central longitudinal portion 40 of the blade 12a so that the upper and lower edges 16 and 24 of the blade are equi-distant (for example, about 6 cm) from the tubing 10. Nails 42 or other suitable fastening means can then be driven through the blade 12a to attach the hose to its support or supports.

Although the best way of making the hose described above is by using the so-called dual-hardness extrusion method, it is also possible for the blade 12 and the tubing 10 to be manufactured separately and then to be bonded together by any suitable bonding means such as the application of heat or by the use of a bonding agent. However, it is likely that this form of construction will prove to be more expensive than a hose made by a dual-hardness extrusion method.

I claim:

1. A one-piece watering hose incorporating fixing means for fixing the hose to the ground without the need of separate fixing means, the hose comprising a length of flexible tubing made of a plasticised synthetic plastics material with one end of the tubing being connectable to a water-tap, there being spaced-apart spray apertures along the length of the tubing in the form of slits lying generally parallel to the longitudinal axis of the tubing, and a single, strip-like, laterally-stiff, imperforate thin blade of unplasticised synthetic plastics material of a hardness greater than that of the plasticised tubing material extending longitudinally of, and parallel to, the tubing for the full length thereof with a longitudinal portion of the blade extending over the full length of the blade being integrally and permanently bonded to the tubing over the full length of the tubing, at least one longitudinal edge of the blade being spaced away from the tubing and being made sufficiently sharp along the entire length of the blade to enter the ground under pressure applied downwardly to the blade.

* * * * *